United States Patent [19]
Glover et al.

[11] Patent Number: 5,091,633
[45] Date of Patent: Feb. 25, 1992

[54] UNITIZED ODOMETER ROLL ASSEMBLY FOR VEHICLES AND ROLL INTERCONNECTING METHOD

[76] Inventors: Alfred H. Glover, Decatur; Joseph T. Betterton, Arab; Richard L. Biegler, Huntsville, all of Ala.

[21] Appl. No.: 656,333

[22] Filed: Feb. 19, 1991

[51] Int. Cl.$^5$ .............................................. G01C 22/00
[52] U.S. Cl. .................................... 235/95 R; 235/96; 235/139 A
[58] Field of Search ................ 235/95 R, 96, 144 HC, 235/144 SM, 139 A

[56] References Cited

U.S. PATENT DOCUMENTS

| | | | |
|---|---|---|---|
| 2,117,024 | 5/1938 | Helgeby et al. | 235/144 SM |
| 3,432,096 | 3/1969 | Powell | 235/96 |
| 3,495,773 | 2/1970 | Hachtel | 235/96 |

Primary Examiner—L. T. Hix
Assistant Examiner—Eddie C. Lee
Attorney, Agent, or Firm—Kenneth H. MacLean

[57] ABSTRACT

In this arrangement the rolls of an odometer are serially built up on a support shaft and are sequentially interconnected by pinion gears which drivingly mesh with gear teeth internally of the rolls. These pinion gears are operatively mounted on partition plates which are interposed between each of the externally numbered rolls. The rolls are incrementally rotated by cooperating transfer and gear teeth on the rolls and the pinion gears so that distances traveled are accurately measured in predetermined increments. The rolls are initially stacked with number alignment and to maintain number alignment, the partition plates between each rolls are mechanically interlocked by pin and pocket construction that extend transversely from the extremity of a tangentially extending tang thereon. Adjacent pin and pocket of adjacent tangs are telescoped together to interlock all of the partition plates together so the odometer rolls are operatively interconnected and effectively unitized with numbers aligned for incremental drive from the input and are not subject to independent rotation from finger touch or higher loads when being installed or removed from the support therefor.

6 Claims, 1 Drawing Sheet

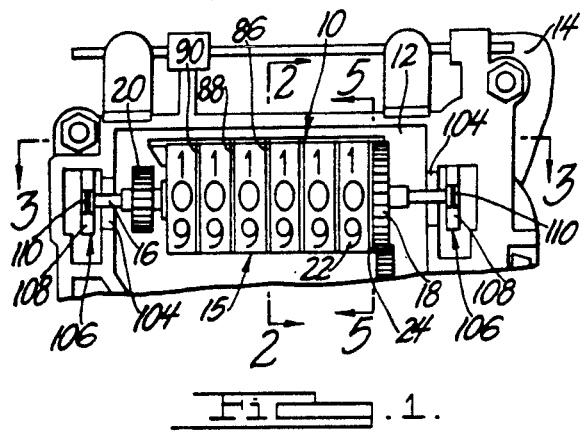
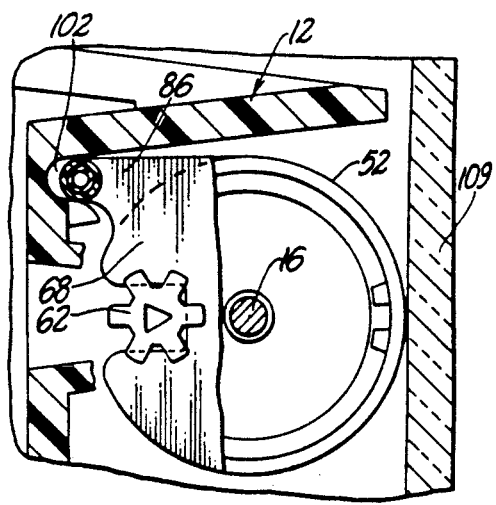
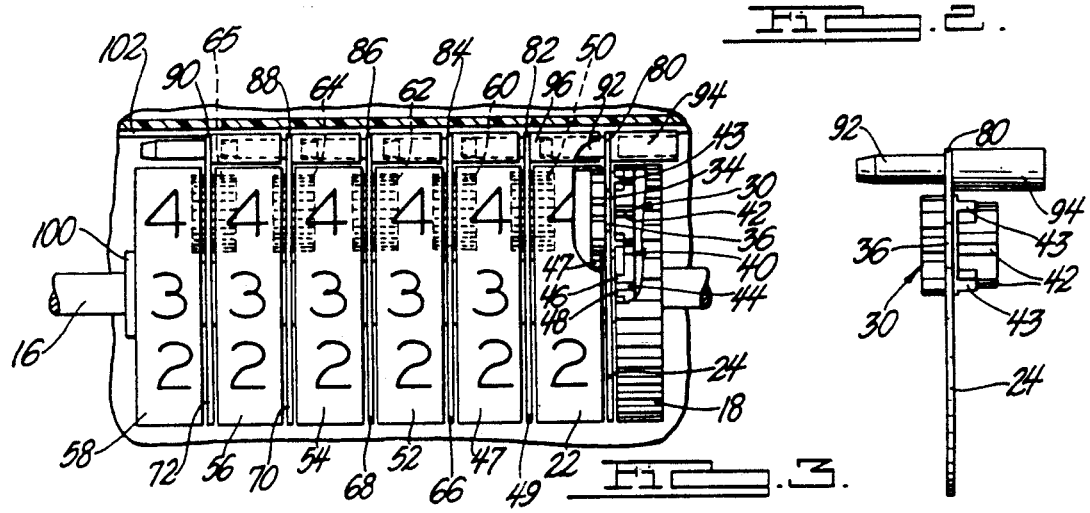
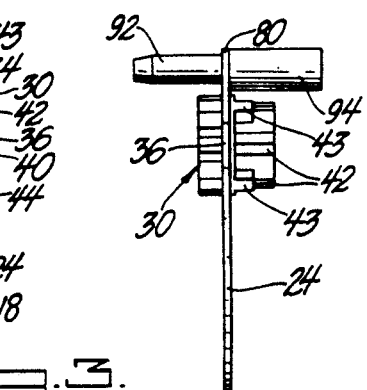
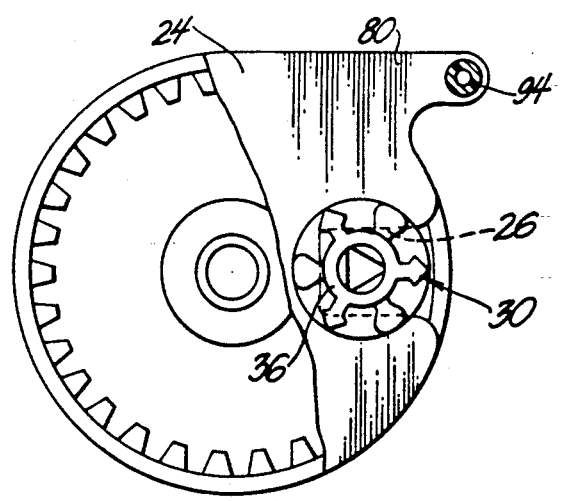
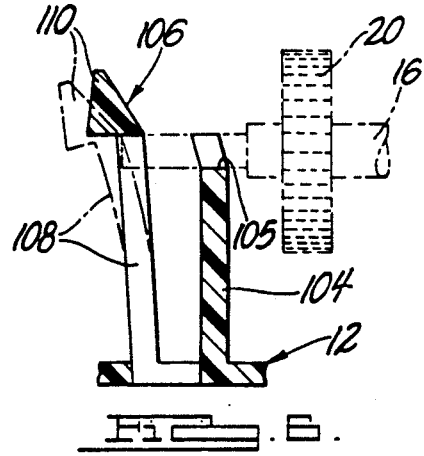

5,091,633

UNITIZED ODOMETER ROLL ASSEMBLY FOR VEHICLES AND ROLL INTERCONNECTING METHOD

BACKGROUND OF THE INVENTION

This invention relates to multi-roll measuring instruments such as vehicle odometers, and more particularly to a new and improved distance measuring roll assembly featuring a plurality of rolls mounted on a shaft with partition plates sandwiched therebetween that carry pinion gears which drivingly interconnect the rolls and which have tang like extensions for aligning the rolls to a zero start position. These extensions have pin and pocket means interconnecting adjacent partition plates so that the rolls are unitized on build up and are held in position and are ready for optimized installation or repair without disturbance of roll position.

Prior to the present invention, various multi-roll odometer designs have been designed in which partition plates have been utilized to carry the pinion gears that interconnect the rolls so that the rolls incrementally measure distances traveled by the vehicle employing the odometer. While the prior devices were generally satisfactory, they were subject to misalignment prior to their installation into a support bracket since the rolls could be readily misaligned, such as by slight finger touch of one of the rolls, whereby the numbers on the rolls were inadvertently turned out of alignment prior to installation into their support bracket. This resulted in part rejection and required time consuming realignment of the rolls prior to assembly into an odometer bracket for installation in a vehicle. Furthermore, with prior constructions, removal was difficult since the rolls had to be handled with particular care to prevent their misalignment of roll numbers as registered on removal.

In the present invention, the numbered rolls of a vehicle odometer have partition plates mounted therebetween. Each of the partition plates carries an interconnecting pinion gear that drivingly interconnect the rolls so that distances are accurately recorded. The partition plates are generally flattened and each is formed with a tangentially extending tang that projects outwardly of the roll assembly. Uniquely, each tang carries at its end a specialized transversely-extending pin and pocket so that adjacent partition plates will be connected with one another on the sequential build up of the rolls and partition plates and pinions on a centralized shaft into a unitized roll assembly. This in effect mounts the pinions on interconnected partition plates and effectively prevent the rolls from being inadvertently turned relative to each other so the numbers thereon are not turned out of predetermined alignment.

With this invention, there is accordingly a new construction and method for untizing the rolls of an odometer to provide improved assembly and installation and removal, if required, with minimized potential for misalignment of roll numbering.

These and other features, objects and advantages of this invention will become more apparent from the following detailed description and drawing in which:

BRIEF DESCRIPTION OF THE DRAWINGS

FIG. 1 is a front elevation view of a roll assembly unitized and mounted in a support bracket illustrating a preferred embodiment of this invention;

FIG. 2 is an enlarged sectional view with parts broken away of the odometer roll assembly taken generally along line 2—2 of FIG. 1;

FIG. 3 is an enlarged view of the roll assembly taken generally along lines 3—3 of FIG. 1;

FIG. 4 is an end view of one of the partition plates and pinion gear assembly as used in the roll assembly of FIGS. 1, 2 and 3;

FIG. 5 is a sectional view with parts broken away as taken generally along lines 5—5 of FIG. 1;

FIG. 6 is a sectional view of the shaft support structure of the unitized roll assembly.

DETAILED DESCRIPTION OF THE DRAWINGS

Turning now in greater detail to the drawings, there is in FIG. 1 an odometer 10, of which only a portion is shown, that is mounted by a bracket 12 to support structure 14 within a vehicle to record distances traveled by the vehicle. The odometer 10 has a plurality of rolls 15 which are conventionally numbered from zero through the numeral nine on their external peripheries at equal intervals and which are mounted for rotation on a transverse shaft 16. A cylindrical roll drive gear 18 located to the right hand side when viewing the rolls 15 is driven by the shaft 16 which, in turn, is conventionally driven by input gear 20. Immediately to the left of the roll drive gear 18 is a tenths roll 22 rotatably mounted on shaft 16 that is adapted to record the tenths of the basic distance measuring unit such as one mile or one kilometer, as used in most countries.

To operatively interconnect the roll input drive gear 18 with the tenths roll 22, there is a partition plate 24 rotatably mounted on shaft 16 in between the roll input drive gear 18 and the tenths roll 22. This partition plate 24 is radially slotted at 26 to rotatably support a pinion gear 30. As best shown in FIGS. 3, 4 and 5, the pinion gear has an annular cylindrical slot 34 formed therein to define a cylindrical pivot shaft 36 that fits into the radial slot 26 of the partition plate 24 so that the pinion gear can turn when actuated by the roll drive gear 18.

To this end, the input drive roll 18 has a reduced diameter and very narrow internal track 40 on which the ends of the long teeth 42 of the pinion gear 30 ride. Formed in this track construction is a tooth space 44 defined between two arcuately spaced transfer teeth 46 and 48 that extend laterally from the track, as best shown in FIG. 3. The roll input drive gear turns without turning the tenths roll 22 until the end of the leading transfer tooth 46 rides under the long pinion tooth 42 and strikes the leading edge of the following short tooth 43 of the pinion gear. When this action occurs, the transfer tooth 46 will turn the pinion gear 30 and the corresponding long tooth will enter the long tooth space 44. With the pinion gear 30 turning, the tenths roll 22 which has internal teeth 47 that mesh with the teeth on the left hand side of the pinion gear 30, will be indexed one tenth of a turn to record the distance as measured by the odometer. As the input gear continues to turn the long tooth of the pinion gear rolls out of the tooth space and the next long tooth of the pinion gear engages the track, as it is known in this art. This action continues with the tenths roll recording one tenth of a revolution for every revolution of the input roll.

The tenths roll 22 is drivingly interconnected to the units roll 47 by a similar partition plate 48 and pinion gear 50 in the same manner so that for every complete revolution of the tenths roll the units roll will rotate one tenth of a turn.

The same arrangement follows for the tens, hundreds, thousands and ten thousands rolls 52, 54, 56, and 58 respectively interconnected by pinion gears 60, 62, 64, and 65 mounted on the interspaced partition plates 66, 68, 70, and 77 respectively, as described above, so that the rolls 15 accurately record the distances traveled by the vehicle.

A detailed description of this gearing and the interconnection of the rolls can be found in my copending application U.S. Ser. No. 07/597,211 entitled RESET TRIP ODOMETER FOR VEHICLES filed Oct. 15, 1990, assigned to the assignee of this invention and hereby incorporated by reference.

The particular gearing arrangement, while allowing the rolls to accurately record distances traveled, will not in itself prevent relative roll rotation before assembly into the supporting bracket 12. Accordingly, difficulties have been experienced in assembly of the rolls partition plates and pinion gears with roll numbers properly aligned in zero alignment. This basically occurs because the gears allow relative rotation between the rolls before installation into their supporting bracket. For example, slight finger touch of inspectors, or assemblers, may easily cause one or more of the rolls to turn relative to the other rolls so that the numerals thereon do not accurately align before the installer can insert the assembly of rolls into the support bracket. This results in part rejection necessitating the tedious and time consuming task of realigning the rolls and maintaining the rolls in proper alignment until accurately installed in the bracket.

To eliminate or substantially reduce these problems, the partition plates of the present invention are made with elongated tangs 80, 82, 84, 86, 88 and 90 which project tangentially from each of the flattened partition plate. Importantly, the partition plate tangs 80 through 90 have pin and socket construction, such as pin 92 and socket 94 on the tang 80 of plate 24. As the roll assembly is built up, the pin of one partition plate is inserted into the next adjacent socket. For example, when the odometer of FIGS. 1 and 3 is being assembled, the pin 92 of partition plate 24 is inserted in the cylindrical socket 96 of the next adjacent partition plate 49 as it is installed on shaft 16 on top of tenths roll 22. The build up of the other rolls and partition plates is the same and in a serial manner. With all of the partition plates accordingly interconnected, they are effectively interlocked and cannot be relatively turned to any great degree.

Since the patition plates are interlocked, with the pins and sockets forming a segment and cylindrical retainer shaft they are relatively fixed. The pinion gears are resultantly fixed in their assembled position so that they can be only turned sequentially with input from the input gear 20 or input drive roll 18. Accordingly with this assembly, the odometer rolls are effectively unitized and cannot be turned by mere finger touch or by other normally occuring forces which would otherwise cause relative roll rotation.

With this construction, even a high torque load is effectively resisted by the pin and socket lock shaft interconnection, and if overtorqued, they would break apart and distort to a point at which reassembly could not be readily accomplished. This insures integrity of the assembly and improves resistance to more tampering.

This invention therefore improves roll assembly and roll assembly methods since the assembler can start with the input roll and stack the first partition plate and roll on the shaft 16 with the pinion gear 30 drivingly interconnecting the input drive gear 18 to the tenths roll 22. Next, the units roll is installed with its pinion gear 50 in place and the second partition plate 49 is installed so that its socket 96 will closely fit onto pin 92 to thereby interconnect partition plates 49 and 24. This procedure will continue, and with this method each partition plate will be interlocked with previous partition plate until the final roll is placed on the shaft and is secured thereon by a locking plate 100 to complete the assembly of the fully unitized roll assembly. The assembler can then handle the roll assembly with increased efficiency since the tangs are prealigned and ready for insertion into the elongated retention pocket 102, shown best in FIG. 2. As the interconnected pins and sockets enter the pocket 102, the numbers will be accurately aligned, as shown in FIGS. 1 and 3.

FIG. 6 illustrates the retention of the unitized roll assembly into the bracket 12. The bracket construction is of a suitable plastics material and each end has as a supporting post 104 that includes a saddle 106, U-shaped in cross section to receive and support the shaft 16. A resilient retainer post 105 having resilient legs 108 extend upward from the bracket and terminate into a camming and retainer head 110. This construction is the same as that of U.S. Pat. No. 4,842,425, issued June 27, 1989, assigned to the assignee of this invention and hereby incorporated by reference. With this construction, the unitized roll assembly with assured number alignment can be readily inserted into the retention bracket. During assembly, the retainer heads will be cammed outboard by the ends of the shaft 16 and the resiliency of the legs 108 will effect recovery of the retainer head, as illustrated in the full time position. Accordingly, the unitized roll assembly can be built up and quickly assembled into its bracket without disturbance of the lineup of roll numerals with the pins and socket construction forming a unitized and elongated cylindrical retainer integral with the partition plates.

If desired, the pins and socket can be glued or otherwise fastened to one another or polygonally cross-sectioned pin and pocket construction can be employed instead of the particular cylindrical construction shown as a preferred embodiment.

A transparent viewing cover 109, shown best in FIG. 2, covers the odometer and allows the vehicle driver to conveniently view the distances recorded by the rolls.

While the above description constitutes preferred embodiments and methods of the invention, it will be appreciated that the invention can be modified or varied without departing form the spirit or scope or fair meaning of the following claims.

We claim:

1. An odometer adapted to be installed in a support for use in a vehicle to record distances traveled from a start position, comprising: shaft means, a plurality of counting rolls operatively mounted on said shaft means in spaced side by side relationship for rotation with respect to one another, a plurality of laterally spaced partition plate means each extending in a separate plane for separating said rolls from one another, each of said rolls having a central hub receiving said shaft means and having an outer periphery with spaced numbers thereon and having an internal drive surface, each of said rolls having a support portion extending between said hub and said outer periphery, a plurality of pinion gear means respectively supported by said partition plate means and operatively associated with said internal drive surfaces for operatively interconnecting said rolls so that said rolls can sequentially turn and record distances traveled by the vehicle, and connector means operatively carried directly by said partition plate means and extending laterally from the planes of said partition plate means for sequential interfitting with one another to thereby join said partition plate means to one another and maintain said rolls at a predetermined relatively rotated position with respect to one another as said odometer is initially assembled prior to the installation thereof into said support.

2. The odometer of claim 1 wherein said connector means comprises pin and socket means extending laterally from the plane each of said partition plate means and wherein said pin means of any one of said connector means is telescopically fitted within the socket means of the next adjacent connector means.

3. An odometer for an automotive vehicle to record distance traveled by the vehicle, comprising: a drive shaft having an axis of rotation, a plurality of circular rolls having indicia on an external surface thereof and operatively mounted on said drive shaft for rotation with respect to the axis, gear means for drivingly interconnecting said rolls so that a rotational drive of a first of said rolls through a predetermined number of turns will incrementally turn the other of said rolls relative to each other, partition plate means operatively supporting each of said gear means and operatively disposed in separate planes between said rolls so that said rolls are operatively geared to one another, and tang means projecting from each of said partition plate means in said associated plane to effect the alignment of the indicia on said rolls into a predetermined pattern, and pin and socket interlock means associated with said tang means extending transverse with respect to said planes and sequentially interfitting with one another to thereby operatively interlock said partition plate means to one another so that said rolls are maintained in operative position with respect to one another whereby said indicia on said rolls are maintained is substantial predetermined alignment, rotatable input means operatively connected to said drive shaft to effect the rotation of said drive shaft and a sequential operation of said rolls.

4. The odometer of claim 3 wherein said pin and socket interlock means forms an elongated and segmented retainer member, and further including bracket means having support means for supporting said drive shaft by the ends thereof and having pocket means for receiving said segmented retainer member.

5. A method of sequentially building-up a plurality of externally numbered rolls into an odometer to effect the unitization of the rolls with aligned numbers and facilitate installation of said unitized rolls with aligned numbers into a support and so that they can be serially rotated in incremental fashion to measure distance, comprising the steps of:
   a. installing an input roll on a shaft having internal gear means thereon;
   b. installing a first partition plate on said shaft with pinion gear means thereon so that the pinion gear means operatively interconnects with said input roll;
   c. inserting a second roll having internal gear means on the shaft so that internal drive means thereon operatively interconnects with the pinion gear on the first partition plate;
   d. inserting a second partition plate on the shaft with second pinion gear means thereon so that the second pinion gear means interconnects with internal gearing on said second roll and;
   e. sequentially interconnecting the partition plates directly to one another with interfitting parts supported by and extending laterally of each of said plates so that the plates are positively interconnected with one another to thereby prevent relative rotation of said partition plates and said rolls with respect to each other to facilitate the installation of said rolls as a unit into a support bracket without inadvertently turning said rolls.

6. A method of making a unitized odometer assembly having a plurality of operatively interconnected rolls with distance indicating indicia thereon operatively mounted on a rotatable drive shaft and separated by partition plate means mounted on said shaft which carry pinion gear means that operatively interconnect said rolls so that said rolls incrementally rotate to measure distance and which carry pin and socket members laterally extending therefrom so that they can be interconnected to inhibit the inadvertent rotation of said rolls with respect to one another prior to the installation of said odometer assembly into a support bracket comprising the steps of:
   a. securing a roll drive gear on said rotatable shaft for rotation therewith;
   b. stacking a first partition plate means on said shaft to a position adjacent to said roll drive gear so that said pinion gear means carried by said first partition plate means can be turned by said roll drive gear;
   c. stacking a first roll on said shaft to a position adjacent to said first partition plate means so that said pinion gear means of said first partition plate means drivingly engages said first roll so that said first roll can be incrementally driven by said roll drive gear;
   d. stacking a second partition plate means on said shaft to a position adjacent to said first roll so that said pinion gear means on said second partition plate operatively engages said first roll and said first roll is sandwiched between said first and second partition plate means while interconnecting said first and second partition plate means by the telescopic engagement of said pin and socket means associated therewith to thereby inhibit the inadvertent turning of said first roll relative to said input gear means;
   e. stacking a second roll on said shaft so that said pinion gear means on said second partition plate means operatively and drivingly connects thereto;
   f. stacking a third partition plate means on said shaft so that said pinion gear means on said third partition plate means operatively engages said second roll and said second roll is sandwiched between said third and second partition plate means while connecting said third and second partition plate means by said pin and socket means to inhibit the inadvertent rotation of said rolls;
   g. continuing the alternating stacking of additional rolls and partition plate means in the manner as defined in steps c, d, e and f above until the odometer assembly is completed and said telescoped pin and socket means defines a retainer to be affixed to said support bracket.

* * * * *

UNITED STATES PATENT AND TRADEMARK OFFICE
CERTIFICATE OF CORRECTION

PATENT NO. : 5,091,633

DATED : February 25, 1992

INVENTOR(S) : Alfred H. Glover, Joseph T. Betterton, Richard L. Biegler and Bruce Hepler It is certified that error appears in the above-identified patent and that said Letters Patent is hereby corrected as shown below:

On Title page, item [76], insert,

--Bruce Hepler, Huntsville, Mi.

Signed and Sealed this

Thirtieth Day of March, 1993

Attest:

STEPHEN G. KUNIN

Attesting Officer

Acting Commissioner of Patents and Trademarks